United States Patent
Patil et al.

(10) Patent No.: US 9,186,528 B2
(45) Date of Patent: Nov. 17, 2015

(54) ADJUSTABLE LOW PRESSURE WARNING DEVICE

(75) Inventors: Swapnil Gopal Patil, Maharashtra (IN); Garaga Phani Kumar, Andhra Pradesh (IN); Swan Tuffery, Bouillargues (FR); Bharat Bhushan Arora, Ambala (IN)

(73) Assignee: Honeywell International Inc., Morristown, NJ (US)

( * ) Notice: Subject to any disclaimer, the term of this patent is extended or adjusted under 35 U.S.C. 154(b) by 840 days.

(21) Appl. No.: 13/451,942

(22) Filed: Apr. 20, 2012

(65) Prior Publication Data

US 2013/0276217 A1    Oct. 24, 2013

(51) Int. Cl.
*A62B 17/00* (2006.01)
*G01L 7/16* (2006.01)

(52) U.S. Cl.
CPC .................................. *A62B 17/006* (2013.01)

(58) Field of Classification Search
CPC .... A61B 17/00; A61B 17/006; A61B 17/008; G01L 7/00; G01L 7/16; G01L 7/163; G01L 7/166; G01L 9/0089; G01L 19/08; G01L 19/10; G01L 19/01
USPC ........ 116/34 B, 34 R, 70, 112, 264, 265, 266, 116/268, 272; 2/2.11, 2.15, 457; 73/146.8, 73/744

See application file for complete search history.

(56) References Cited

U.S. PATENT DOCUMENTS

| | | | |
|---|---|---|---|
| 628,478 A * | 7/1899 | Kuhne | 73/744 |
| 1,807,752 A * | 6/1931 | Poster | 73/146.8 |
| 3,776,174 A | 12/1973 | Kunoth | |
| 4,174,673 A | 11/1979 | Tung et al. | |
| 4,222,276 A * | 9/1980 | DeRogatis | 73/714 |
| 4,310,014 A | 1/1982 | Parker | |
| 4,350,115 A * | 9/1982 | Pasternack | 116/70 |
| 4,497,434 A * | 2/1985 | Lawless | 236/23 |
| 4,790,811 A * | 12/1988 | Bloxom, Jr. | 604/27 |
| 4,800,373 A | 1/1989 | Mayz | |
| 5,191,317 A * | 3/1993 | Toth et al. | 340/626 |
| 5,293,864 A * | 3/1994 | McFadden | 128/201.29 |
| 7,000,483 B2 | 2/2006 | Pekar et al. | |
| 7,493,808 B2 | 2/2009 | Milanovich et al. | |

(Continued)

FOREIGN PATENT DOCUMENTS

DE    10315607 A1    12/2004
EP    1093830 A1    4/2001

(Continued)

OTHER PUBLICATIONS

AQUA 80-451 Pressure Reducing Valve with Dial Adjuster and Integral Strainer, CLA-VAL Model AQUA 80-451; Information Sheet; 3 pages.

*Primary Examiner* — R. A. Smith
(74) *Attorney, Agent, or Firm* — Conley Rose, P.C.; Kristin Jordan Harkins

(57) ABSTRACT

A low pressure warning device that comprises a piston located inside the device, where the piston partitions the device into a first chamber communicating with a first opening and a second chamber communicating with a second opening, an adjustable stop, and a spring located inside the device and configured to bias the piston to a position based on a position of the adjustable stop and based on a pressure differential between the first opening and the second opening, wherein a low pressure differential warning state is associated with a position of the piston.

20 Claims, 8 Drawing Sheets

(56) References Cited

U.S. PATENT DOCUMENTS

| | | |
|---|---|---|
| 7,730,847 B1 * | 6/2010 | Redd et al. ............ 116/274 |
| 2003/0112136 A1 | 6/2003 | Reidhead |
| 2004/0226558 A1 * | 11/2004 | Kausch ............ 128/201.29 |
| 2007/0215148 A1 | 9/2007 | Tuffery |
| 2008/0257027 A1 * | 10/2008 | Wu .................. 73/146.8 |
| 2012/0066819 A1 * | 3/2012 | Carron ............... 2/456 |

FOREIGN PATENT DOCUMENTS

| | | | |
|---|---|---|---|
| GB | 2215058 A * | 9/1989 | .......... G01L 7/16 |
| GB | 2449314 A | 11/2008 | |
| KR | 2010111086 A * | 10/2010 | .......... G01L 7/16 |

* cited by examiner

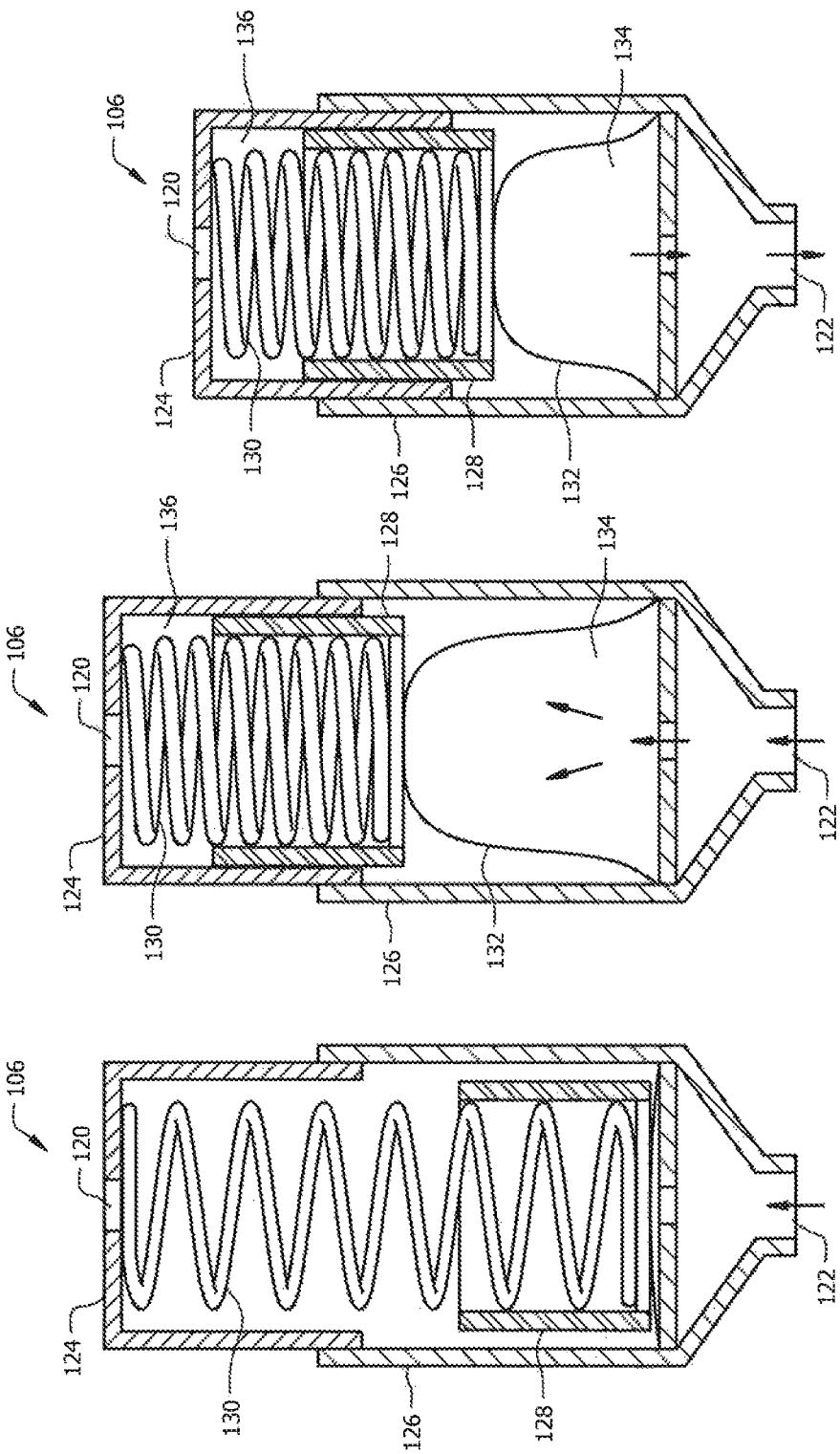

ADJUSTABLE LOW PRESSURE WARNING DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Encapsulated protective suits may be worn in contaminated areas to protect the wearer of the suit. For example, workers may wear an encapsulated protective suit while working inside of a nuclear powered electrical generating plant or in the presence of radioactive materials. An encapsulated protective suit may be a one-time use type of system, wherein after a single use the suit is disposed of. An encapsulated protective suit may receive breathing air during normal operating conditions via an external air flow hose connected to the suit. It may be desirable to maintain a positive pressure differential between the inside of the suit and the outside of the suit. The positive pressure differential may reduce the chances of material, such as radioactive particles or other hazardous material, from entering the protective suit. Additionally, the positive pressure differential may promote proper inflation of the suit.

SUMMARY

In an embodiment, a low pressure warning device is disclosed. The low pressure warning device comprises a piston located inside the device, where the piston partitions the device into a first chamber communicating with a first opening and a second chamber communicating with a second opening, an adjustable stop, and a spring located inside the device and configured to bias the piston to a position based on a position of the adjustable stop and based on a pressure differential between the first opening and the second opening, wherein a low pressure differential warning state is associated with a position of the piston.

In an embodiment, an encapsulated protective suit is disclosed. The encapsulated protective suit comprises a skin and a low pressure warning device coupled to the skin. The low pressure warning device comprises a piston located inside the device, where the piston partitions the device into a first chamber communicating with a first opening and a second chamber communicating with a second opening, an adjustable stop, and a spring located inside the device and configured to bias the piston to a position based on a position of the adjustable stop and based on a pressure differential between the first opening and the second opening, wherein a low pressure differential warning state is associated with a position of the piston.

In an embodiment, a method of using an encapsulated protective suit is disclosed. The method comprises donning an encapsulating protective suit, the suit comprising a skin and a low pressure warning device coupled to the skin, the low pressure warning device comprising a piston located inside the device, where the piston partitions the device into a first chamber communicating with a first opening and a second chamber communicating with a second opening, an adjustable stop, and a spring located inside the device and configured to bias the piston to a position based on a position of the adjustable stop and based on a pressure differential between the first opening and the second opening, wherein a low pressure differential warning state is associated with a position of the piston.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2A, FIG. 2B, FIG. 2C, FIG. 2D, and FIG. 2E illustrate views of a first embodiment of a low pressure warning device according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Figure 1:
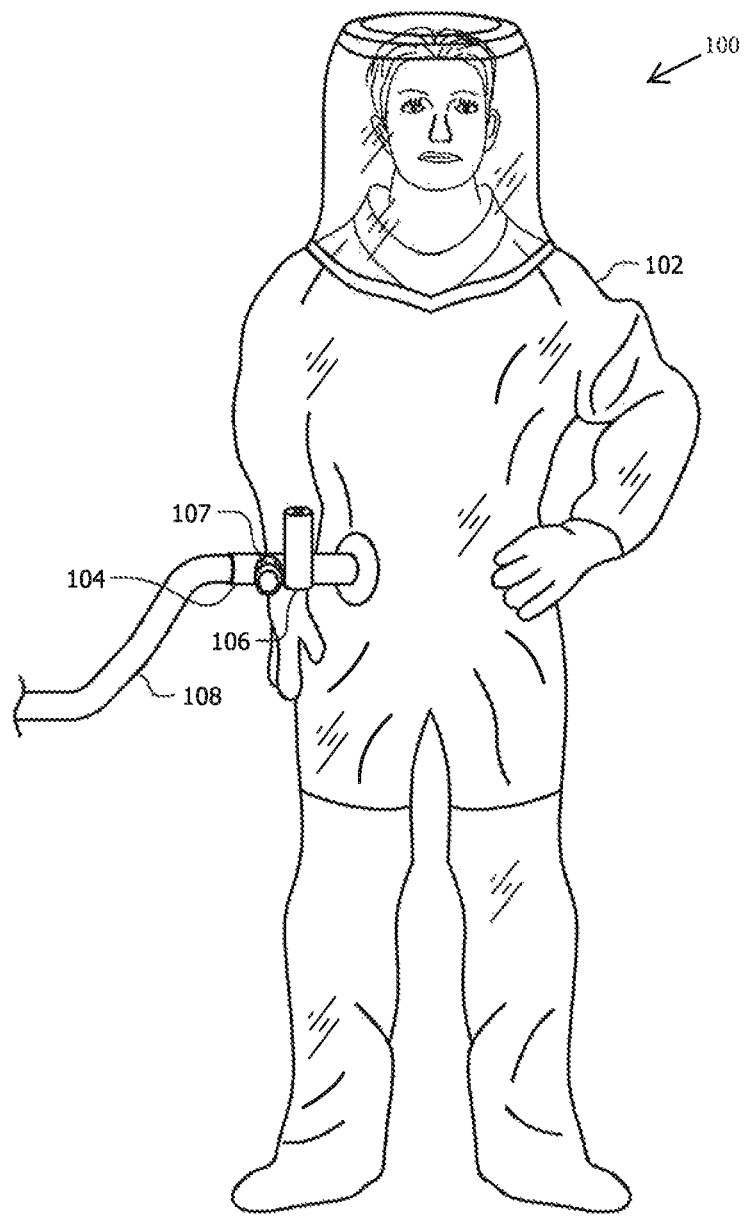
FIG. 1 illustrates an encapsulated protective suit according to an embodiment of the disclosure.
Figure 2E:
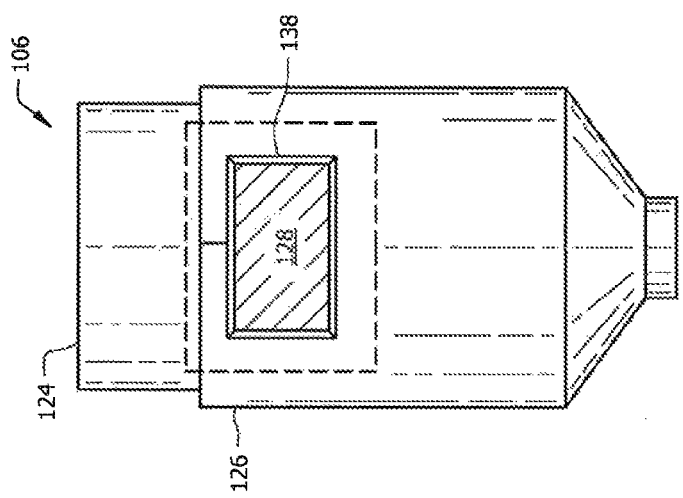
Figure 2D:
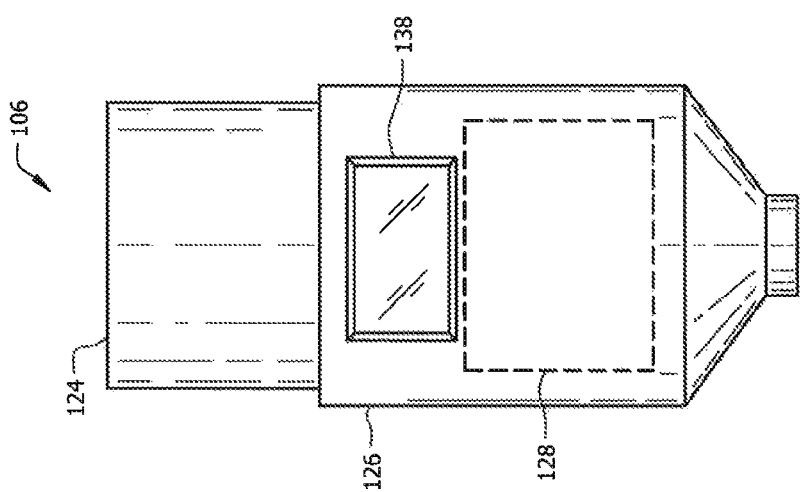

Turning now to FIG. 1, an encapsulated protective suit 100 is described. In an embodiment, the protective suit 100 comprises a skin 102 and a breathable air receptacle 104. The breathable air receptacle 104 comprises a low pressure warning device 106 and a flow control valve 107. When in use, a breathable air supply line 108 may be coupled to the breathable air receptacle 104 to provide breathable air and inflating pressure to the suit 100. In some contexts the breathable air receptacle 104 may be referred to as a breathable air inlet. In an embodiment, the suit 100 may be a single use suit that is disposed of after one use. It may be desirable to dispose of the suit 100 after a single use rather than risk the suit contaminating clear areas, as may be the case if the exterior of the suit is exposed to hazardous materials such as radioactive particles. In manufacturing a single use suit 100, it may be desirable to reduce the cost of the suit 100 by using relatively inexpensive components in manufacturing the suit. In another embodiment, however, the suit 100 may be used a plurality of times.

The user dons or puts on the suit 100 and may further don or put on booties, shoes, or boots on the feet to protect the integrity of the feet of the suit 100 and gloves to seal the suit 100 at the hands. The suit 100 may be a fully encapsulated protective suit. Air for breathing under normal operating conditions may be provided by the breathable air supply line 108, for example an air hose coupled to a powered air purifying respirator device (not shown), and air within the suit 100 is breathed by the user. The air flow may provide additional functions, for example inflating the suit 100 and/or cooling the occupant of the suit 100. In an embodiment, an exhaust valve (not shown) coupled to the suit 100 allows air to leave the suit. The suit 100 may be used in any contaminated environment, for example a workplace having radioactive materials and/or a nuclear powered electrical power generation facility. The suit 100 may be used as well in other contaminated environments. It is understood that in different embodiments the suit 100 may take different forms from that illustrated in FIG. 1.

While using the suit 100 in the contaminated environment, it is preferred that a positive pressure differential be maintained between the interior and exterior of the suit 100. This positive pressure differential may provide a margin of safety. If a minor breach of the skin 102 occurs, contaminated material is not likely to enter the suit 100 but rather may be discouraged from entry by air flowing from the interior to the exterior of the suit 100 at the location of the minor breach. Additionally, the positive pressure differential promotes inflating the suit 100. When the low pressure warning device 106 indicates a low differential pressure operating condition of the suit 100, the user of the suit may adjust the flow of the air supply from the line 108 by turning or otherwise adjusting the flow control valve 107. Generally it is desired that the suit 100 be relatively air-tight, with the exception of the exhaust valve described above, to promote efficiency.

For a given suit 100 and a given environment in which the suit 100 is to be used a given pressure differential may be preferred. For different suits 100 and/or different environments, a different pressure differential may be preferred. For example, in a first suit 100 used in a first environment, a pressure differential of X PSI may be preferred while for a second suit 100 used in the first environment, a pressure differential of Y PSI may be preferred, where X does not equal Y. As another example, in a first suit 100 used in a first environment, a pressure differential of X PSI may be preferred while for the first suit 100 used in a second environment, a pressure differential of Z PSI may be preferred, where X does not equal Z. A manufacturer of encapsulated protective suits 100 may need to stock a plurality of different low pressure warning devices that conform to the prior art (i.e., low pressure warning devices that are not adjustable after assembly) that are calibrated for indicating different low pressure warning thresholds for use in different suits 100 and/or for use in different environments. Maintaining adequate stock of each of the differently calibrated low pressure warning devices that conform to the prior art may entail significant inventory costs for the manufacturer of the suits 100. The present disclosure teaches a low pressure warning device 106 that has an adjustable indication threshold. Thus, the same low pressure warning device 106 may be adjusted to indicate a low pressure differential condition at different thresholds.

Turning now to FIG. 2A, FIG. 2B, FIG. 2C, FIG. 2D, and FIG. 2E, a low pressure warning device 106 is described. In an embodiment, the device 106 comprises a first opening 120 and a second opening 122. The device 106 may be coupled to the breathable air receptacle 104 so the second opening 122 communicates with an interior of the suit 100 and with an interior of the breathable air receptacle 104 and the first opening 120 communicates with the exterior of the suit 100. The device 106 comprises a first tubular component 124 and a second tubular component 126 that nest at least partly one within the other and which may be said to constitute a body of the low pressure warning device 106. While illustrated with the first tubular component 124 nested within the second tubular component 126, in another embodiment, the second tubular component 126 may nest within the first tubular component 124. The body of the device 106 retains a piston 128 and a spring 130.

By adjusting the location of the first tubular component 124 relative to the second tubular component 126, the low pressure differential indication threshold of the device 106 may be adjusted. For example, the first tubular component 124 may be coupled to the second tubular component 126 by mated helical threads and grooves such that turning the first tubular component 124 in a first rotational sense causes the first tubular component 124 to nest more deeply into the second tubular component 126 and turning the first tubular component 124 in a rotational sense opposite to the first rotational sense causes the first tubular component 124 to nest less deeply into the second tubular component 126. As an alternative, example, the first and second tubular components 124, 126 may couple by a friction fit and the low pressure differential indication threshold may be adjusted by sliding the first tubular component 124 relative to the second tubular component 126. One skilled in the art will appreciate that other structures for controllably moving and then maintaining the position of the first tubular component 124 relative to the second tubular component 126 are feasible and are also contemplated by the present disclosure. In an embodiment, some of the components of the device 106 may be made of plastic, for example, the tubular components 124, 126, and/or the piston 128.

As seen in FIG. 2B and FIG. 2C, a particular force applied to the spring 130 by a given pressure differential between the openings 122, 120, compresses the spring 130 by a particular amount. If the position of the first tubular component 124 is changed relative to the second tubular component 126, while the given pressure differential between the openings 122, 120 remains unchanged, the spring 130 remains compressed by the same particular amount. The result of this is that the position of the piston 128 under these conditions shifts relative to the second tubular component 126. Said in another way, by adjusting the relative position between the tubular components 124, 126, the low pressure warning device 106 may be used with high pressure inputs and/or with low pressure inputs to indicate a suitable low pressure warning condition, as adjusted. By establishing a calibration mark or point on the second tubular component 126—for example by providing a viewing window 138 in the second tubular component 126 through which the piston 128 or a portion of the piston 128 may be seen—the threshold for indications of differential pressure may be adjusted by moving the first tubular component 124 relative to the second tubular component 126.

While in an embodiment the first tubular component 124 and the second tubular component 126 are circular in section, in other embodiments the first tubular component 124 and the second tubular component 126 may take other forms. For example, in an embodiment, the first tubular component 124 and the second tubular component 126 may have a hexagonal form in section.

The piston 128 generally has the same form in section as the tubular components 124, 126, for example a circular section. In an embodiment, the second tubular component 126 retains a diaphragm 132 that substantially blocks air flow between the openings 120, 122, as best seen in FIG. 2B and FIG. 2C. The diaphragm 132 defines a first chamber 134 of the device 106 and the space between the piston 128 and the first tubular component 124 defines a second chamber 136. As the piston 128 moves in the body of the device 106, the chambers 134, 136 change volume. As the piston 128 moves towards the first opening 120, the volume of the first chamber 134 increases and the volume of the second chamber 136 decreases. As the piston 128 moves away from the first opening 120, the volume of the first chamber 134 decreases and the volume of the second chamber 136 increases.

The location of the piston 128 within the body of the device 106 provides an indication of the pressure differential between the openings 120, 122. For example, as the pressure present at the second opening 122 (i.e., in the inlet line 108 and in the interior of the suit 100) increases while the pressure outside the suit 100 remains constant, the force exerted on the spring 130 by the diaphragm 132 (the force of the diaphragm 132 may be transmitted to the spring 130 by the piston 128) increases, causing the spring 130 and the piston 128 to be displaced upwards in the body of the device 106 towards the first opening 120. As the pressure present at the second opening 122 decreases, the spring 130 and the piston are displaced downwards in the body of the device 106.

The position of the piston 128 may be visible to a user of the suit 100 who may use the visible position of the piston 128 as indication to adjust the flow of breathable air using the flow control valve 107. For example, if the piston is located too close to the first opening 120, this may indicate an excess rate of flow of breathable air to the suit 100, which may be associated with premature discharge of a battery of a powered air purifying respirator device. The user of the suit 100 may adjust the valve 107 to reduce the rate of flow of breathable air to the suit 100. Alternatively, if the piston 128 is located too close to the second opening 120, this may indicate a deficient rate of flow of breathable air to the suit 100, and the user of the suit 100 may adjust the valve 107 to increase the rate of flow of breathable air to the suit 100.

In an embodiment, the body of the device 106 may comprise the viewing window 138 for viewing the piston 128, for example a window in the second tubular component 126. While illustrated as a window that is rectangular in FIG. 2D and FIG. 2E, in an embodiment, the viewing window 138 has the form of a cylindrical shell that extends completely around the second tubular component 126 in a continuous band, thereby allowing the visual reading of the device 106 from many angles. The portions of the body of the device 106 that are outside of the viewing window 138 may be colored a dark color or may be formed of a material or process that makes the body of the device 106 at that point at least partly opaque. In an embodiment, when the piston 128 is not visible in the viewing window 138, the rate of flow of breathable air to the suit 100 is sufficient or excessive and when the piston 128 is visible in the viewing window 138, the rate of flow of breathable air to the suit 100 may be deficient. In this embodiment, the piston 128 may have a red surface color, for example painted red or covered with a red sticker or decal. Alternatively, the piston 128 may have a different surface color or surface treatment that is associated with the deficient rate of flow of breathable air. The user may adjust the rate of air flow to the suit 100 using the valve 107 until the piston 128 is visible in the viewing window 138, meaning a deficient rate of air flow to the suit 100 exists, and then adjust the air flow to the suit 100 using the valve 107 until the piston 128 just goes out of sight in the viewing window 138, thereby avoiding an excess rate of flow of breathable air to the suit 100.

In another embodiment, when the piston 128 is visible in the viewing window 138, the rate of flow of breathable air to the suit 100 is sufficient or excessive. In this embodiment, the piston 128 may have a green surface color, for example painted green or covered with a green sticker or decal. Alternatively, the piston 128 may have a different surface color or surface treatment that is associated with the sufficient or excessive rate of flow of breathable air. In this embodiment, when the piston 128 is not visible in the viewing window 138, this may indicate that a low differential pressure condition exists and may be considered a warning state or a warning presentation.

In yet another embodiment, the piston 128 may have two different colors or different surface appearances, when a deficient rate of air flow exists, a first one of the colors or surfaces is visible in the viewing window 138 and when the rate of air flow is sufficient or excessive, the second one of the colors or surfaces is visible in the viewing window 138. In another embodiment, the piston 128 may have three different colors of three different surface appearances, when a deficient rate of air flow exists, a first one of the colors or surfaces is visible in the viewing window 138, when the rate of air flow is sufficient, the second one of the colors or surfaces is visible in the viewing window 138, and when the rate of air flow is excessive, the third one of the colors of surfaces is visible in the viewing window 138.

Turning now to FIG. 3A, FIG. 3B, FIG. 3C, and FIG. 3D, an embodiment of a second low pressure warning device 150 is described. In an embodiment, the second low pressure warning device 150 comprises a third opening 152, a fourth opening 154, a body 156, a piston 158, a spring 160, a threaded adjustment pin 162, and a spring stop plate 163. In an embodiment, the second device 150 may further comprise a bypass tube 164 and a whistle 166. The second device 150 is also suitable for use with the breathable air receptacle 104 to determine a pressure differential condition and for adjusting a rate of flow of breathable air into the suit 100. In an embodiment, some of the components of the second device 150 may be made of plastic, for example, the body 156, the piston 158, the optional bypass tube 164, and/or the whistle 166.

The second device 150 comprises a third chamber 168 and a fourth chamber 169. The space between the piston 158 and the fourth opening 154 defines the third chamber 168, and the space between the piston 158 and the spring stop plate 163 may define the fourth chamber 169. Alternatively, the fourth chamber 169 may be defined as the space between the piston 158 and the wall of the body 156 where the threaded adjustment pin 162 couples to the body 156. As the piston 158 moves in the body 156, the chambers 168, 169 change volume. As the piston 158 moves towards the threaded adjustment pin 162, the volume of the third chamber 168 increases and the volume of the fourth chamber 169 decreases. As the piston 158 moves away from the threaded adjustment pin 162, the volume of the third chamber 168 decreases and the volume of the fourth chamber 169 increases.

The pressure differential indication in the second device 150 is also provided by the position of the piston 158 within the body 156. The differential pressure indication threshold is adjustable by moving the threaded adjustment pin 162 further into the body 156, thereby pushing the spring stop plate 163 further into the body 156, and by moving the threaded adjustment pin 162 further out of the body 156, thereby pulling the spring stop plate 163 further out of the body 156. In an embodiment, the threaded adjustment pin 162 is coupled to the spring stop plate 163. In another embodiment, however, the threaded adjustment pin 162 is not coupled to the spring stop plate 163, but the spring 160 operates to keep the spring stop plate 163 in contact with and stopped by the threaded adjustment pin 162.

The piston 158 may make a seal with the walls of the body 156. For example, the piston 158 may have one or more O-rings that at least partially seal between the piston 158 and the body 156. It is understood that as used herein, seal does not imply that no air flow may pass the seal but only that the air flow is attenuated to a degree that promotes the establishment of a pressure differential between the third chamber 168 and the fourth chamber 169. Alternatively, the second device 150 may comprise a diaphragm (not shown) that defines the third chamber 168 and drives the piston 158 against the spring 160. The diaphragm ma be located within the body 156, between the openings of the bypass tube 164.

Figures 3A, 3B:
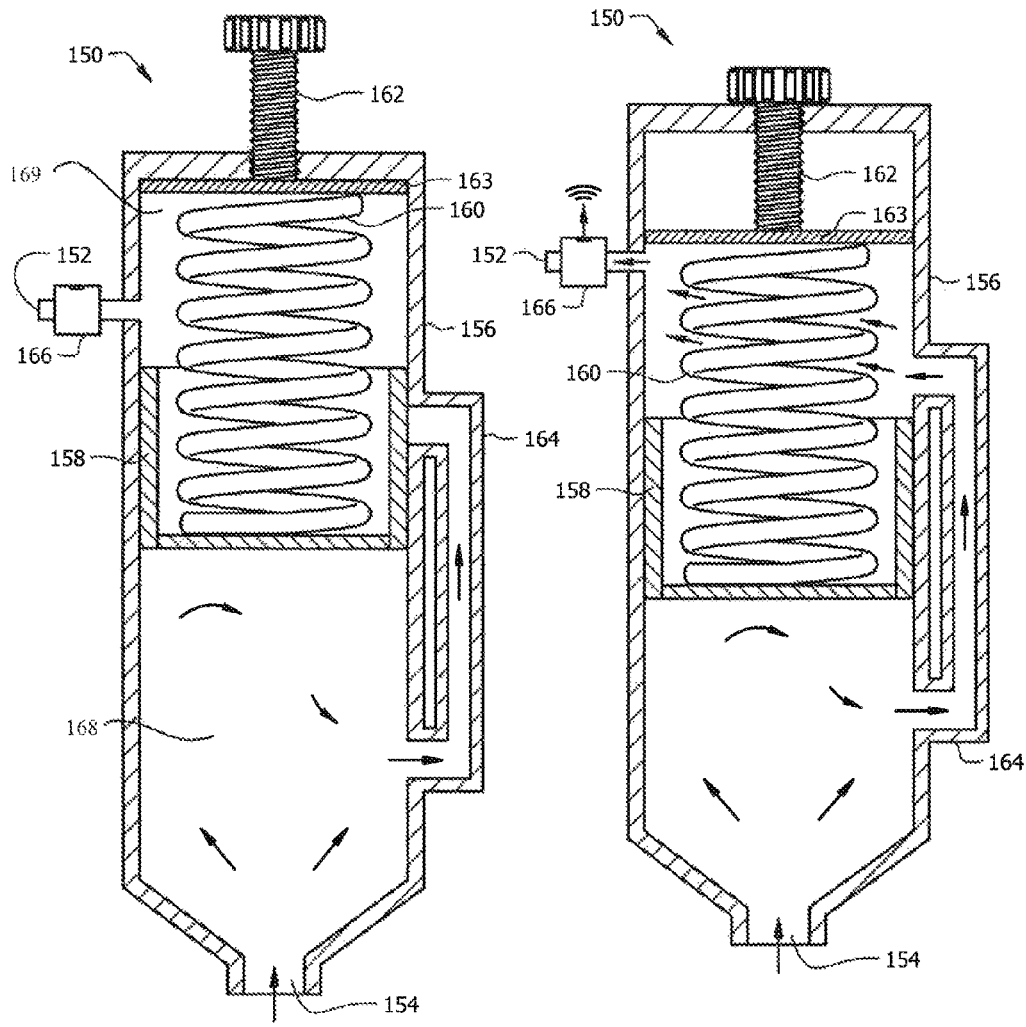
FIG. 3A, FIG. 3B, FIG. 3C, and FIG. 3D illustrate views of a second embodiment of a lower pressure warning device according to an embodiment of the disclosure.
Figures 3C, 3D:
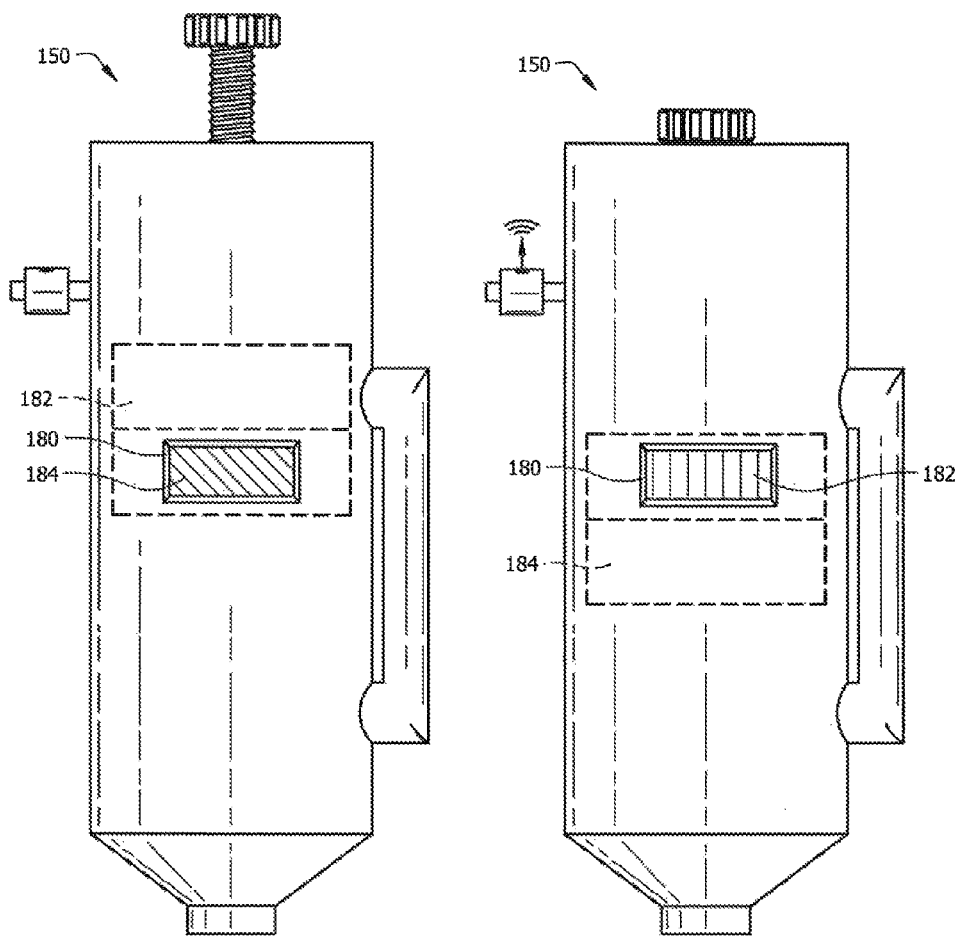

In a first adjustment configuration illustrated in FIG. 3A, a given pressure differential between the third opening 152 and the fourth opening 154 may drive the piston 158 to the position illustrated, corresponding to a condition of sufficient rate of flow of breathable air. In this position, the piston 158 substantially blocks one of the openings of the bypass tube 164 and prevents air flow from the third chamber 168 to the fourth chamber 169. When the threaded adjustment pin 162 is moved further into the body 156, as illustrated in FIG. 3B, at the same given pressure differential between the third opening 152 and the fourth opening 154, the piston 158 is driven to a position that unblocks the opening of the bypass tube 164 to the fourth chamber 169. In this condition, air flows between the third chamber 168 and the fourth chamber 169 via the bypass tube 164. When the air flows, it flows out the third opening 152, through the whistle 166, causing the whistle 166 to sound, thereby providing an audible low pressure differential warning. In some embodiments of the second device 150, there is no bypass tube 164 and no whistle 166.

In an embodiment, a viewing window 180 is provided in the body 156. While illustrated as a window that is rectangular in FIG. 3C and FIG. 3D, in an embodiment, the viewing window 180 has the form of a cylindrical shell that extends completely around the body 156 in a continuous band, thereby allowing the visual reading of the second device 150 from may angles. In an embodiment, the presence of the piston 158 in the viewing window 180 may indicate a low differential pressure condition associated with an insufficient rate of flow of breathable air to the suit 100. In another embodiment, the presence of the piston 158 in the viewing window 180 may indicate a normal or high differential pressure condition associated with a sufficient or excessive rate of flow of breathable air to the suit 100

In an embodiment, the piston 158 may have a color or surface treatment that makes the piston 158 more visible in the viewing window 180. In an embodiment, the piston 158 may have a first color 182 or surface treatment associated with a low differential pressure condition and a second color 184 or surface treatment associated with a normal or high differential pressure condition. In still another embodiment, the piston 158 may have the first color 182 or surface treatment associated with the low differential pressure condition, the second color 184 or surface treatment associated with the normal differential pressure condition, and a third color or surface treatment associated with the high differential pressure condition. A user of the suit 100 can adjust the flow of breathable air to the suit 100 using the valve 107 based on the indications provided by the second device 150. For further information about low pressure warning devices, see U.S. Patent Application Publication No. US 2007/0215148, entitled "Secured Ventilated Breathing Device, In Particular for Hostile Medium," by Swan Tuffery, which is incorporated herein by reference in its entirety.

While the devices 106, 150 were described in the context of using as a component of a fully encapsulated suit 100, it will be appreciated that the devices 106, 150 may be used in many other applications. The devices 106, 150 may be used in breathing apparatuses that are not fully encapsulated suits but which maintain a pressure differential between an interior and the exterior of the breathing apparatus. Additionally, the devices 106, 150 may be used in other applications where an indication of differential pressure relative to a threshold is called for. The present disclosure contemplates using the devices 106, 150 in these applications.

Figure 4:
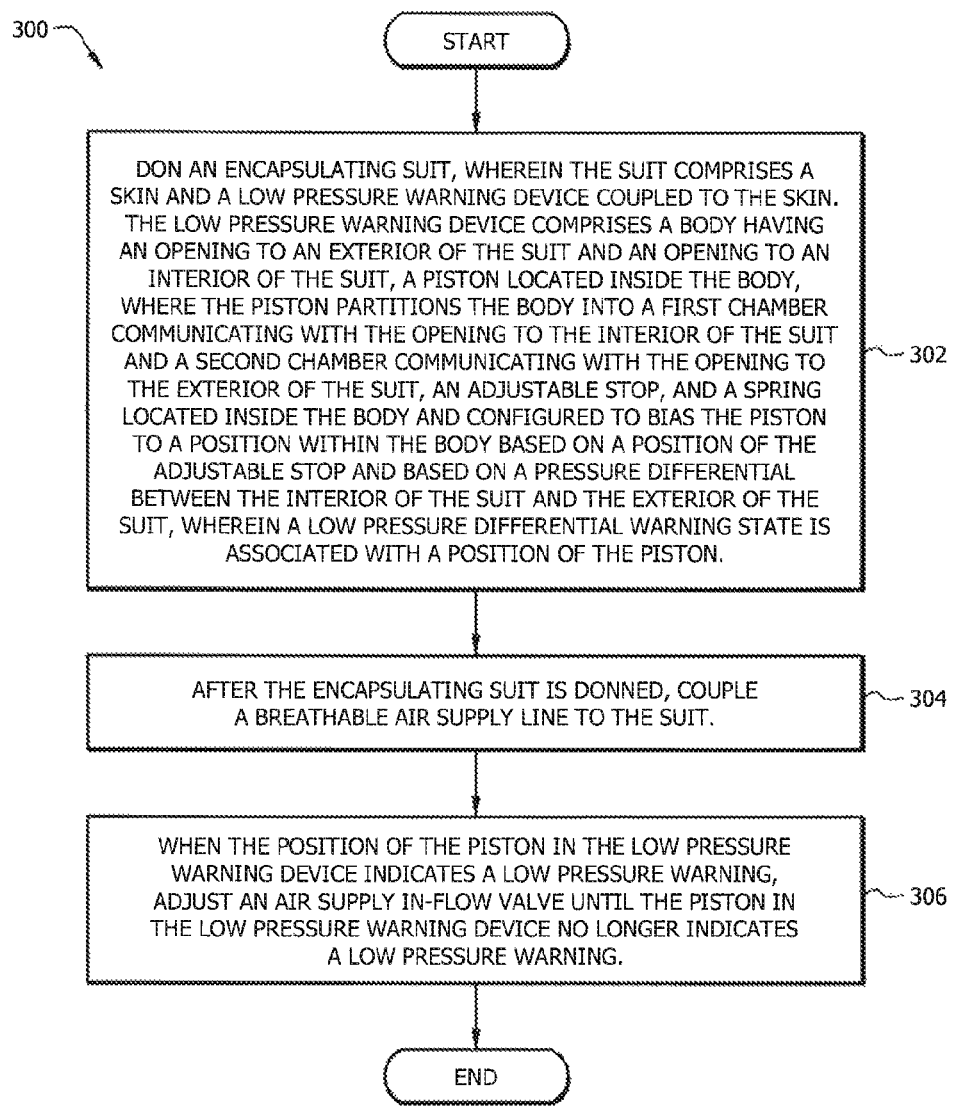
FIG. 4 is a flow chart of a method according to an embodiment of the disclosure.

Turning now to FIG. 4, a method 300 is described that may be practiced using either the first device 106 or the second device 150 with the suit 100 described above. At block 302, don an encapsulating suit, wherein the suit comprises a skin and a low pressure warning device coupled to the skin. The low pressure warning device comprises a body having an opening to an exterior of the suit and an opening to an interior of the suit, a piston located inside the body, where the piston partitions the body into a first chamber communicating with the opening to the interior of the suit and a second chamber communicating with the opening to the exterior of the suit, an adjustable stop, and a spring located inside the body and configured to bias the piston to a position within the body based on a position of the adjustable stop and based on a pressure differential between the interior of the suit and the exterior of the suit, wherein a low pressure differential warning state is associated with a position of the piston.

At block 304, after the encapsulating suit is donned, couple a breathable air supply line to the suit. At block 306, when the position of the piston in the low pressure warning device indicates a low pressure warning condition, adjust an air supply in-flow valve until the piston in the low pressure warning device no longer indicates a low pressure warning.

In an embodiment, the first device 106 or the second device 150 may be calibrated to adjust a low differential pressure warning threshold. The low differential pressure warning device may have an opening coupled to a pressure line that is adjusted to a calibrated pressure, for example a 5 PSI relative to the ambient pressure. The pressure line may feature a valve for adjusting the pressure differential between the pressure line and the ambient pressure. The pressure line may also feature a pressure gauge that indicates the measured pressure differential. The device 106, 150 may be adjusted so that a low differential pressure warning is indicated by the device 106, 150. For example, the red portion of the piston comes into view in a viewing window of the device 106, 150 and/or the green portion of the piston goes out of view in the viewing window of the device 106, 150. In an embodiment, the whistle 166 sounds. The pressure line may be adjusted to increase the pressure differential between the pressure line and the ambient pressure, and the exit from the low differential pressure warning state of the device 106, 150 may be confirmed. For example, the red portion of the piston goes out of view in a viewing window of the device 106, 150 and/or the green portion of the piston comes into view in a viewing window of the device 106, 150. This calibration equipment may be used to adjust different instances of the same model of low differential pressure warning device 106, 150 to have different low differential pressure warning thresholds by performing the adjustments of indication at different operating pressures in the supply line of the test apparatus.

Figure 5A:
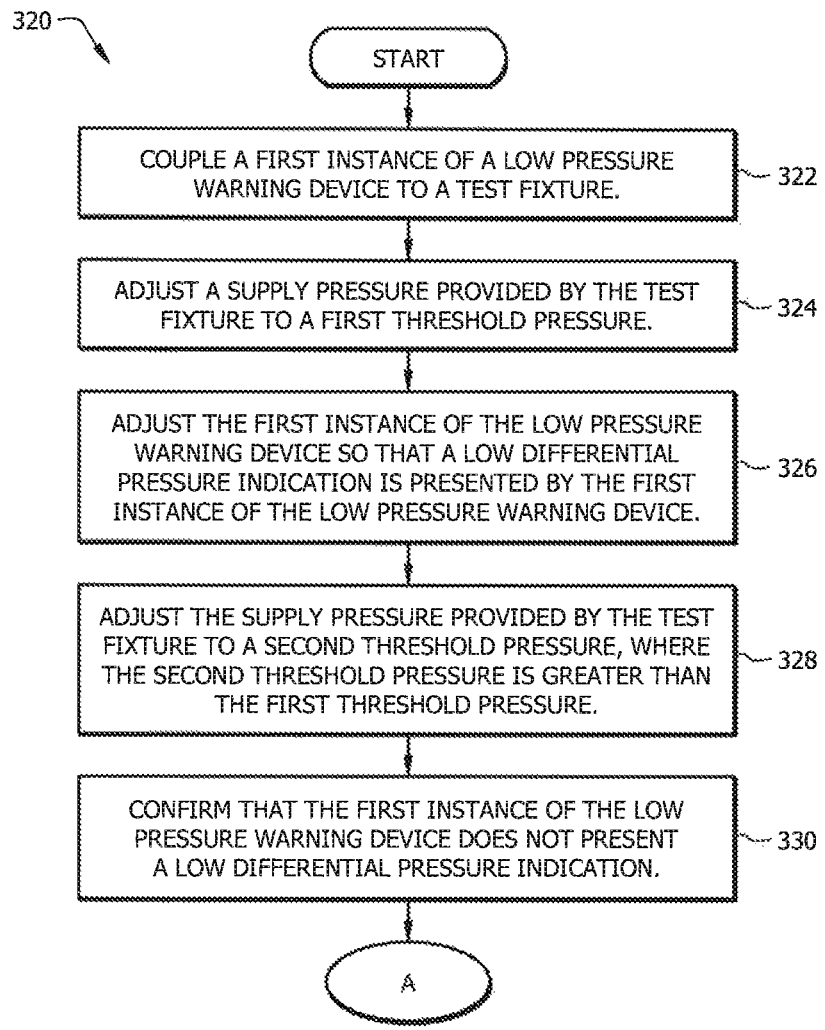
FIG. 5A and FIG. 5B are flow charts of a method according to an embodiment of the disclosure.
Figure 5B:
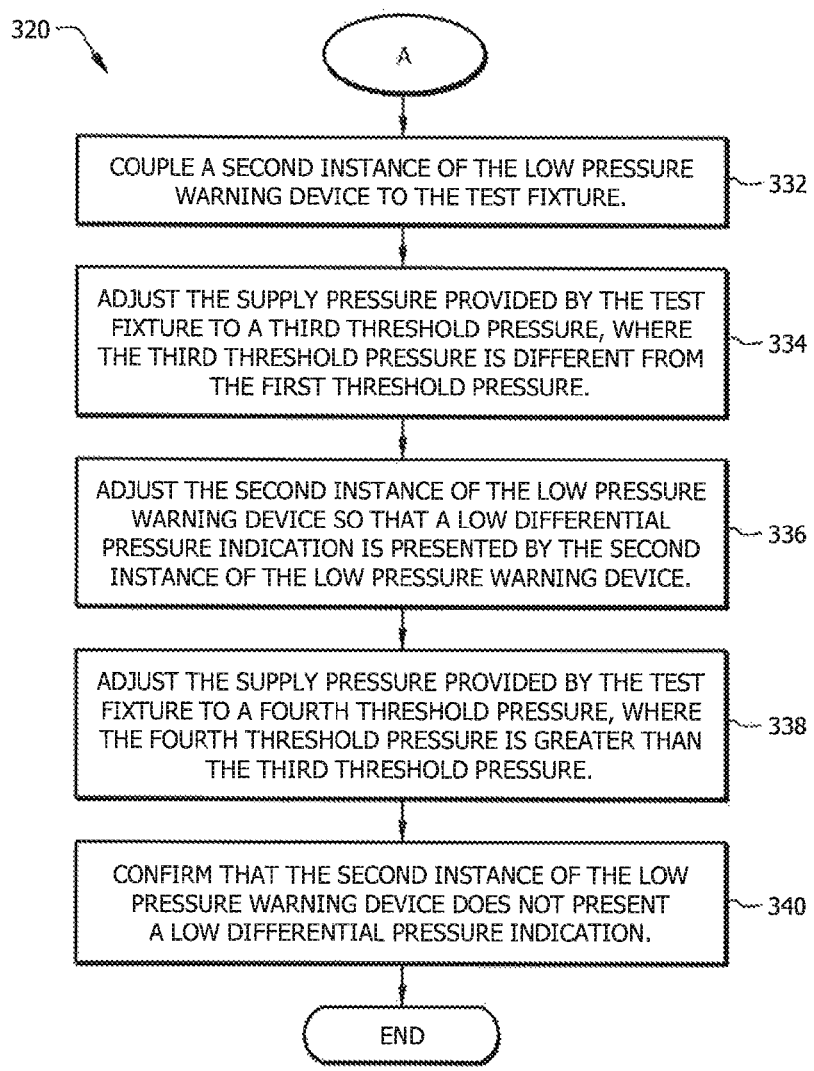

Turning now to FIG. 5A and FIG. 5B, a method 320 is described. At block 322, a first instance of a low pressure warning device is coupled to a test fixture. For example, one of the device 106 or the second device 150 is coupled to the test fixture. The test fixture may be suitable for supplying an air pressure at a constant pressure differential relative to the ambient air pressure. The test fixture may have a control device that promotes increasing and decreasing the supplied air pressure and may have a pressure gauge that promotes monitoring the supplied air pressure.

At block 324, the test fixture is adjusted to provide a supply pressure at a first threshold pressure to the first instance of the low pressure warning device coupled to the test fixture. The first threshold pressure may be a low pressure differential warning threshold defined for use with a specific instance or model of the suit 100. At block 326, the first instance of the low pressure warning device is adjusted so that a low differential pressure indication is presented by the first instance of the low pressure warning device. At block 328, the test fixture is adjusted to provide a supply pressure at a second threshold pressure to the first instance of the low pressure warning device, where the second threshold pressure is greater than the first threshold pressure. At block 330, it is confirmed that the first instance of the low pressure warning device does not present a low differential pressure indication. In some contexts, the blocks 322-330 may be referred to as calibrating the first instance of the low pressure warning device to a first threshold pressure.

At block 332, a second instance of the low pressure warning device is coupled to the test fixture. It is understood that the first and second instances of the low pressure warning device are different instances of the same device, for example, different instances of the device 106 or different instances of the second device 150. The first and second instances of the low pressure warning device may be associated with the same stock keeping unit (SKU) and are substantially identical devices of the same model of low pressure warning device. Their different warning behaviors are established by the different calibrations performed, specifically the different calibration pressures in blocks 324 and 334.

At block 334, the test fixture is adjusted to provide a supply pressure at a third threshold pressure to the second instance of the low pressure warning device coupled to the test fixture, where the third threshold pressure is different from the first threshold pressure. The third threshold pressure may be a low pressure differential warning threshold defined for use with an instance or model of the suit 100 that is different from the instance or model of the suit 100 that is associated with the first instance of the low pressure warning device calibrated in blocks 322-330 above. For example, the suit 100 associated with the first instance of the low pressure warning device may be intended for use in a first work environment associated with a first safety rule or specification for differential pressure in fully encapsulated suits, and the suit 100 associated with the second instance of the low pressure warning device may be intended for use in a second work environment associated with a different safety rule for differential pressure in fully encapsulated suits.

At block 335, the second instance of the low pressure warning device is adjusted so that a low differential pressure indication is presented by the second instance of the low pressure warning device. At block 338, the test fixture is adjusted to provide a supply pressure at a fourth threshold pressure to the second instance of the low pressure warning device, where the fourth threshold pressure is greater than the third threshold pressure. At block 340, it is confirmed that the second instance of the low pressure warning device does not present a low differential pressure indication. In some contexts, the blocks 332-340 may be referred to as calibrating the second instance of the low pressure warning device to a third threshold pressure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments a discrete or separate may be combined or integrated with other systems, modules, techniques, or methods without departing from the scope of the present disclosure. Other timer items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An encapsulated protective suit, comprising
   a skin; and
   a low pressure warning device coupled to the skin, comprising
      a piston located inside the device, where the piston partitions the device into a first chamber communicating with a first opening and a second chamber communicating with a second opening;
      an adjustable stop, and
      a spring located inside the device and configured to bias the piston to a position based on a position of the adjustable stop and based on a pressure differential between the first opening and the second opening,
      wherein a pressure differential state is associated with a position of the piston.

2. The suit of claim 1, further comprising a breathable air inlet having an air flow adjustment valve.

3. The suit of claim 1, wherein the piston comprises a visual insufficient pressure indicating surface, wherein the low pressure warning device is configured so that When a low pressure differential state is experienced, the visual insufficient pressure indicating surface of the piston is visible in a window of the low pressure warning device.

4. The suit of claim 1, wherein the piston comprises a visual sufficient pressure indicating surface, wherein the low pressure warning device is configured so that when a sufficient pressure differential state is experienced, the visual sufficient pressure indicating surface of the piston is visible in a window of the low pressure warning device.

5. The suit of claim 1, wherein the low pressure warning device further comprises mechanical audible alerting device.

6. The suit of claim 1, wherein the spring is a helical compression spring.

7. The suit of claim 1, wherein at least part of the piston has a red outer surface.

8. A low pressure warning device for use with an encapsulated suit. comprising:
   a piston located inside the device, where the piston partitions the device into a first chamber corrnnunicatmg with a first opening configured for fluid communication with an external environment outside the encapsulated suit, and a second chamber communicating with a second opening configured for fluid communication with an interior of the encapsulated suit;
   an adjustable stop;
   a spring located inside the device and configured to bias the piston to a position based on a position of the adjustable stop and based on a pressure differential between the first opening and the second opening; and a flow control valve, wherein a low pressure differential warning state is associated with a position of the piston, wherein the low pressure warning device is operable to indicate a low differential pressure between the encapsulated suit and the external environment, aid wherein the flow control valve is operable to adjust fluid flow into the encapsulated suit.

9. The device of claim 8, Wherein the adjustable stop comprises a spring stop plate located inside the device and stopping one end of the spring and a threaded adjustment pin coupled to the device, wherein when the pin is screwed further into the device, a low pressure differential warning state threshold is increased and when the pin is screwed further out of the device, the low pressure differential warning state threshold is decreased.

10. The device of claim 9, wherein the threaded adjustment pin is one of a set screw or a bolt.

11. The device of claim 8, wherein the adjustable stop comprises a first tubular component and further comprising a second tubular component, wherein the first tubular component is coupled to the second tubular component, wherein the piston and the spring are located inside the first tubular component and the second tubular component, wherein a low pressure differential warning state threshold of the device is adjusted by moving the first tubular component relative to the second tubular component.

12. The device of claim 11, wherein the first tubular component and the second tubular component are threadingly coupled to each other.

13. The device of claim 11, wherein the first tubular component and the second tubular component are slidingly coupled to each other.

14. A low pressure warning device, comprising:
a piston located inside the device where the piston partitions the device into a first chamber communicating with a first opening and a second chamber communicating with a second opening:
an adjustable stop; and
a spring located inside the device and configured to bias the piston to a position based on a position of the adjustable stop and based on a pressure differential between the first opening and the second opening,
wherein a low pressure differential warning state is associated with a position of the piston; the device further comprising a whistle in communication with the second chamber that is configured to sound when the low pressure warning device experiences a pressure differential that is less than a threshold.

15. The device of claim 14, further comprising a bypass pipe between the first chamber and the second chamber, wherein when the low pressure warning device experiences a pressure differential that is less than the threshold, the piston is biased by the spring to a position that unblocks one end of the bypass pipe and opens a flow path from the first chamber the second chamber via the bypass pipe.

16. A method of using an encapsulated protective suit, comprising:
donning an encapsulating protective suit, the suit comprising a skin and a low pressure warning device coupled to the skin, the low pressure warning device comprising a piston located inside the device, Where the piston partitions the device into a first chamber communicating with a first opening and a second chamber communicating with a second opening;
an adjustable stop, and
a spring located inside the device and configured to bias the piston to a position based on a position of the adjustable stop and based on a pressure differential between the first opening and the second opening,
wherein a low pressure differential warning state is associated with a position of the piston;
after donning the encapsulating protective suit, coupling a breathable air supply line to the suit; and
when the position of the piston in the low pressure warning device indicates a low pressure warning, adjusting an air supply in-flow valve until the piston in the low pressure warning device no longer indicates a low pressure warning.

17. The method of claim 16, further comprising providing a visual indication by the low pressure warning device when the pressure differential between the first opening and the second opening is less than a pressure differential threshold.

18. The method of claim 16, further comprising providing a visual indication by the low pressure warning device when the pressure differential between the first opening and the second opening is greater than a pressure differential threshold.

19. The method of claim 16, further comprising providing an audible indication by the low pressure warning device when the pressure differential between the first opening and the second opening is less than a pressure differential threshold.

20. The method of claim 16, further comprising adjusting the adjustable stop of the low pressure warning device.

* * * * *